S. J. VANCE.
Pruning Implements.
No. 156,512.
Patented Nov. 3, 1874.
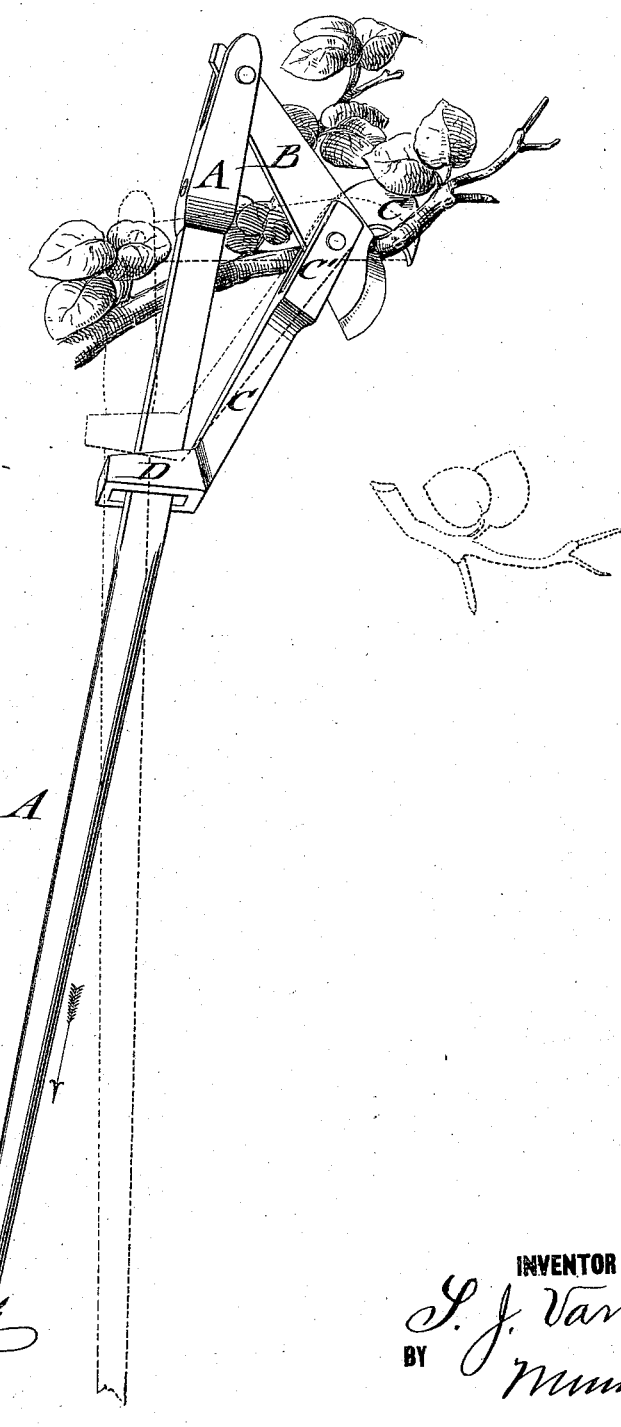

UNITED STATES PATENT OFFICE.

SAMUEL J. VANCE, OF PALMYRA, ILLINOIS.

IMPROVEMENT IN PRUNING IMPLEMENTS.

Specification forming part of Letters Patent No. 156,512, dated November 3, 1874; application filed October 3, 1874.

*To all whom it may concern:*

Be it known that I, SAMUEL J. VANCE, of Palmyra, Macoupin county, Illinois, have invented a new and Improved Pruning-Knife, of which the following is a specification:

The accompanying drawing represents a perspective view of my improved pruning-knife.

My invention relates to a simple, durable, and effective pruning-knife, which cuts the limbs or twigs by lever-power exerted on the cutting-knife and hook by the downward pulling of the handle.

The improvement consists in a handle, to the upper end of which the rear end of the cutting-knife is pivoted, while the front part is pivoted sidewise to a hook, having a side guide plate or ear, and a guide band or sleeve for sliding along the handle part.

In the drawing, A represents the handle, of suitable length for reaching up to the limbs of the trees; B, the cutting blade or knife, which is pivoted by its rear end to the upper end of the handle between suitable lugs or jaws, and with its front end to the hook C, swinging with its cutting-edge along the same, and being guided in steady direction in the recess formed between the hook and a side lug or ear, C', of the same, said recess determining, in connection with the back of the knife, the extreme opened and closed positions of the hook and knife. The lower end of the hook C terminates in a sleeve-shaped guide or band, D, which slides along the handle part.

The hook is placed over a limb, and the knife is closed on the hook by pulling the handle downward through the sleeve of the hook, so as to produce thereby the cutting action. The weight of the hook and knife carries them both in downward direction, and into open position, to be again applied for cutting, forming thereby a quickly and readily manipulated, simple, and strong pruning-knife.

Having thus described my invention, I claim as new and desire to secure by Letters Patent—

The improved pruning-knife, consisting of handle part A, cutting-knife B, pivoted thereto and to the hook C, and of the hook C, being provided with side guide plate or lug C' and sliding sleeve end D, all constructed and operated substantially as specified.

SAMUEL J. VANCE.

Witnesses:
 JOEL P. EADES,
 HENRY C. WILEY.